United States Patent
Van Newenhizen

(10) Patent No.: US 6,510,959 B1
(45) Date of Patent: Jan. 28, 2003

(54) CENTER OPENING TREATMENT TANK FOR USE WITH METAL TANK FLANGES

(75) Inventor: John Van Newenhizen, Mundelein, IL (US)

(73) Assignee: United States Filter Corporation, Palm Desert, CA (US)

( * ) Notice: Subject to any disclaimer, the term of this patent is extended or adjusted under 35 U.S.C. 154(b) by 0 days.

(21) Appl. No.: 09/551,589

(22) Filed: Apr. 18, 2000

(51) Int. Cl.[7] .............................. B65D 8/00; B65D 45/00
(52) U.S. Cl. ....................... 220/4.12; 220/327; 220/601; 220/DIG. 4
(58) Field of Search ................................ 220/4.12, 4.13, 220/582, 592, 586, 601, 640, 661, 62.22, DIG. 4

(56) References Cited

U.S. PATENT DOCUMENTS

| | | | |
|---|---|---|---|
| 589,528 A | | 9/1897 | Hedgewald |
| 2,283,066 A | | 5/1942 | Ingersoll |
| 2,326,263 A | * | 8/1943 | Steiner .................. 220/560.02 |
| 2,496,677 A | * | 2/1950 | Reedy ......................... 220/640 |
| 2,576,457 A | * | 11/1951 | Henderson .................. 220/640 |
| 3,016,161 A | | 1/1962 | Peplin |
| 3,081,905 A | | 3/1963 | Schulze et al. |
| 3,098,578 A | * | 7/1963 | Rudelick .................. 220/4.12 |
| 3,159,306 A | | 12/1964 | Lyall |
| 3,244,197 A | | 4/1966 | Stilwell |
| 3,334,779 A | | 8/1967 | Smith |
| 3,866,792 A | | 2/1975 | Minke |
| 4,240,561 A | | 12/1980 | Hagstrom et al. |
| 4,537,329 A | | 8/1985 | Norton |
| 4,552,166 A | * | 11/1985 | Chadbourne, Sr. et al. ....................... 220/567.1 |
| 4,572,394 A | | 2/1986 | Tanahashi et al. |
| 4,573,694 A | | 3/1986 | Goto et al. |
| 5,135,133 A | * | 8/1992 | Frost .......................... 220/601 |
| 5,217,138 A | * | 6/1993 | Nichols ................. 220/495.06 |
| 5,305,903 A | | 4/1994 | Harde |
| 5,331,841 A | * | 7/1994 | Beaver et al. ............... 73/49.2 |
| 5,345,666 A | | 9/1994 | Matyja |
| 5,518,141 A | * | 5/1996 | Newhouse et al. ......... 220/590 |
| 5,699,272 A | | 12/1997 | Zabinski |
| 6,024,243 A | * | 2/2000 | Palazzo ................... 220/567.1 |
| 6,032,821 A | | 3/2000 | Martin et al. |

FOREIGN PATENT DOCUMENTS

| | | |
|---|---|---|
| DE | 12397 | 4/1956 |
| DE | 1946082 | 3/1971 |

* cited by examiner

*Primary Examiner*—Lee Young
*Assistant Examiner*—Niki M. Eloshway
(74) *Attorney, Agent, or Firm*—Greer, Burns & Crain, LTD.

(57) ABSTRACT

A treatment tank for a water conditioning apparatus has a tank head with a wall, a rim defining a through hole in the wall and a tank ring fixed to the rim. The tank ring is coaxial with the tank head and extends generally axially. The tank also has a generally cylindrical flange defining a nipple portion with a peripheral wall that has a lower edge. The flange also has a shoulder extending radially from the nipple portion with a top surface and an outer peripheral wall extending downward from the top surface. A fastener assembly is engageable on the top surface of the shoulder for securing the flange on the tank head through contact between the fastener assembly and the tank ring.

19 Claims, 2 Drawing Sheets

CENTER OPENING TREATMENT TANK FOR USE WITH METAL TANK FLANGES

BACKGROUND OF THE INVENTION

The present invention relates generally to water treatment tanks of the type used to retain resin beads in a water softener system. More particularly, the present invention includes an improved tank head and flange for simultaneously connecting to a control valve, being the securing point for a tank liner, and retaining a water outlet manifold.

Water treatment tanks are known and used to condition or soften water. The known tanks have a tank head that provides an inlet and an outlet for the water through penetration fittings or collars. The known tanks also have liners to protect the tanks from corrosion and prevent leaching of materials from within the tank. In these conventional tanks, water enters the tank through an inlet, flows to the bottom of the tank while passing through a softening or treatment material, and then enters a manifold near the bottom of the tank to be brought back to the top of the tank, where the treated water exits the tank through an outlet conduit connected to a valve. Examples of such tanks are disclosed in commonly owned U.S. Pat. Nos. 5,174,466 and 5,345,666, which use one central opening with concentric collars and eliminates the need for a gasket.

In other known tanks, direct compression gaskets are used but become ineffective due to "compression set" in the gaskets over age. Thus, the tanks of the '466 and '666 patents were designed to eliminate the gasket. To eliminate the gasket, however, required a complex design with a number of separate parts. O-rings replaced a gasket to create a hermetic seal between the concentric collars. Also, in this design, the outer collar must be under compression and the inner collar receives upward pressure to maintain the tight seal.

Also, in center opening type tanks, such as disclosed in the '466 and '666 patents, the opening of the protective liner is R.F. sealed or welded to an inner surface of an inner collar. This arrangement places the edge of the liner inside the inlet aperture for the tank. In this position, it is extremely difficult and time consuming to weld the liner to the inside of the collar because the position of the liner-collar joint requires cumbersome positioning of the welding tools. The liner also may become susceptible to peeling away from the flange from the force of the incoming water flow.

Further, in conventional tanks such as disclosed in the '466 and '666 patents, the inner collar or flange is typically made of the same type of plastic as the liner rather than metal in order to ensure sealing compatibility between the liner and the collar. The plastic enables the use of molds that can easily form a flange with a threaded exterior so that a threaded nut or exterior collar can engage the flange to secure the flange on the tank head. The molds to form the plastic collar, however, become very expensive when the opening of the collar approaches four inches. This is especially true when the metal flange must be further formed with threads on the exterior of the flange to engage with a nut.

Thus, a main object of the present invention is to provide an improved center opening tank which is easier to assemble than presently known tanks.

Another object of the present invention is to provide an improved center opening tank that provides an air and water tight seal between a plastic liner and a metal flange.

Yet another object of the present invention is to provide an improved center opening tank with a configuration that prevents breaks in the seal between the liner and the flange while eliminating the need for awkward positioning of welding tools.

An additional object of the present invention is to provide an improved center opening tank with a simple configuration while still using a gasket to maintain the seal between the flange and the tank head.

SUMMARY OF THE INVENTION

The above-listed objects are met or exceeded by the present center opening water conditioner tank. To provide a tank that is easier to assemble and maintain with a preferably oval metal flange, the present flange is internally mounted on the tank head and positioned within a through hole on the tank head that is defined by a rim with a tank ring. A fastener assembly engages the flange so that the flange and fastener assembly cooperatively clamp the tank ring. This structure secures the flange to the tank head. In addition, the fastener assembly engages a shoulder portion of the flange. This feature eliminates problematic rotation of the flange by eliminating the nut or collar attached on the exterior of the flange.

More specifically, a treatment tank for a water conditioning apparatus has a tank head with a wall, a rim defining a through hole in the wall and a tank ring fixed to the rim. The tank ring is coaxial with the tank head and extends generally axially. A generally cylindrical flange is also part of the tank and has a nipple portion with a peripheral wall. The flange also has a shoulder extending radially from the nipple portion with a top surface and an outer peripheral wall extending downward from the top surface. A fastener assembly is engageable on the top surface of the shoulder for securing the flange on the tank head through contact between the fastener assembly and the tank ring.

Furthermore, a feature of the present invention also includes a liner diposed in the tank and having an edge secured to the flange between an outer periphery of the shoulder and the tank ring. The liner is secured to the flange even though the liner is not glued, heat sealed or welded to the flange, which eliminates the cost for welding altogether. Furthermore, this configuration disposes the edge away from the flow of water where it cannot be peeled from the flange.

More particularly, a treatment tank for a water conditioning apparatus has a tank head with a wall with an interior surface, a rim defining a through hole in the wall, and a tank ring being coaxial with the tank head and extending generally axially. A generally cylindrical flange defines a nipple portion having a peripheral wall with a lower edge. The flange also has a shoulder and an outer peripheral wall. The shoulder extends radially from the nipple portion and has a top surface. The outer peripheral wall extends generally parallel to the tank ring to matingly register with the tank ring. Additionally, a liner is disposed against the interior surface of the wall of the tank head and has an edge defining an opening. The edge is secured on the flange without adhering or welding the liner to the flange.

Yet another feature of the present invention is a fastener assembly that clamps an annular flat gasket and the liner between the bottom of the tank ring and a ledge radially extending from a base of the shoulder. This configuration provides an air and water tight seal where the outer circumferance of the flange meets the tank head while eliminating the need for a threaded nut that could rotate the flange while it is being tightened.

In more detail, a treatment tank for a water conditioning apparatus also has a shoulder extending radially from the nipple portion and having a top surface, an outer peripheral wall extending generally parallel to the tank ring and a ledge radially extending from the outer peripheral wall. The ledge is configured and disposed to engage the bottom of the tank ring. In addition, a liner is disposed against the interior surface of the wall of the tank head and has a portion disposed along the ledge. A fastener assembly is engageable on the top surface of the shoulder for securing the flange on the tank head through contact between the fastener assembly and the top of the tank ring. Finally, an annular flat gasket is configured and disposed between the tank ring and the liner so that tightening of the fastener assembly clamps the gasket and the liner between the bottom of the tank ring and the ledge for forming a water and air tight seal.

Still another feature of the present invention includes a liner that is secured in two places by pinching the liner between a side wall of the tank ring and an outer peripheral wall of the shoulder and clamping the liner, with a gasket, between the radially extending ledge of the shoulder and the bottom wall of the tank ring. With the liner secured in two separate places, even if the gasket fails due to compression set or other break down due to deformation of the gasket, the liner will remain secured to the flange at the side wall of the tank ring.

In more detail, a treatment tank for a water conditioning apparatus has a tank head with a wall, a rim defining a through hole in the wall, and a tank ring fixed to the rim. The tank ring is coaxial with the tank head and extends generally axially. The tank ring further includes a side wall and a bottom wall. A generally cylindrical flange has a radially extending shoulder with a top surface, a base, an outer peripheral wall extending downward from the top surface to the base, and a ledge radially extending from the base. The ledge is configured to face the bottom wall of the tank ring. A liner disposed against an interior surface of the wall of the tank head has an edge defining an opening to the liner. The liner is configured and disposed on the ledge and on the outer peripheral wall so that the liner is secured between the outer peripheral wall of the flange and the side wall of the tank ring and between the ledge and the bottom wall of the tank ring.

In yet another aspect of the present invention, the fastener assembly has a hold down plate that engages a top of the tank ring when tightened by a bolt that threads into the flange and which provides a simple way to assemble the tank head.

DESCRIPTION OF THE PREFERRED EMBODIMENT

Figure 1:
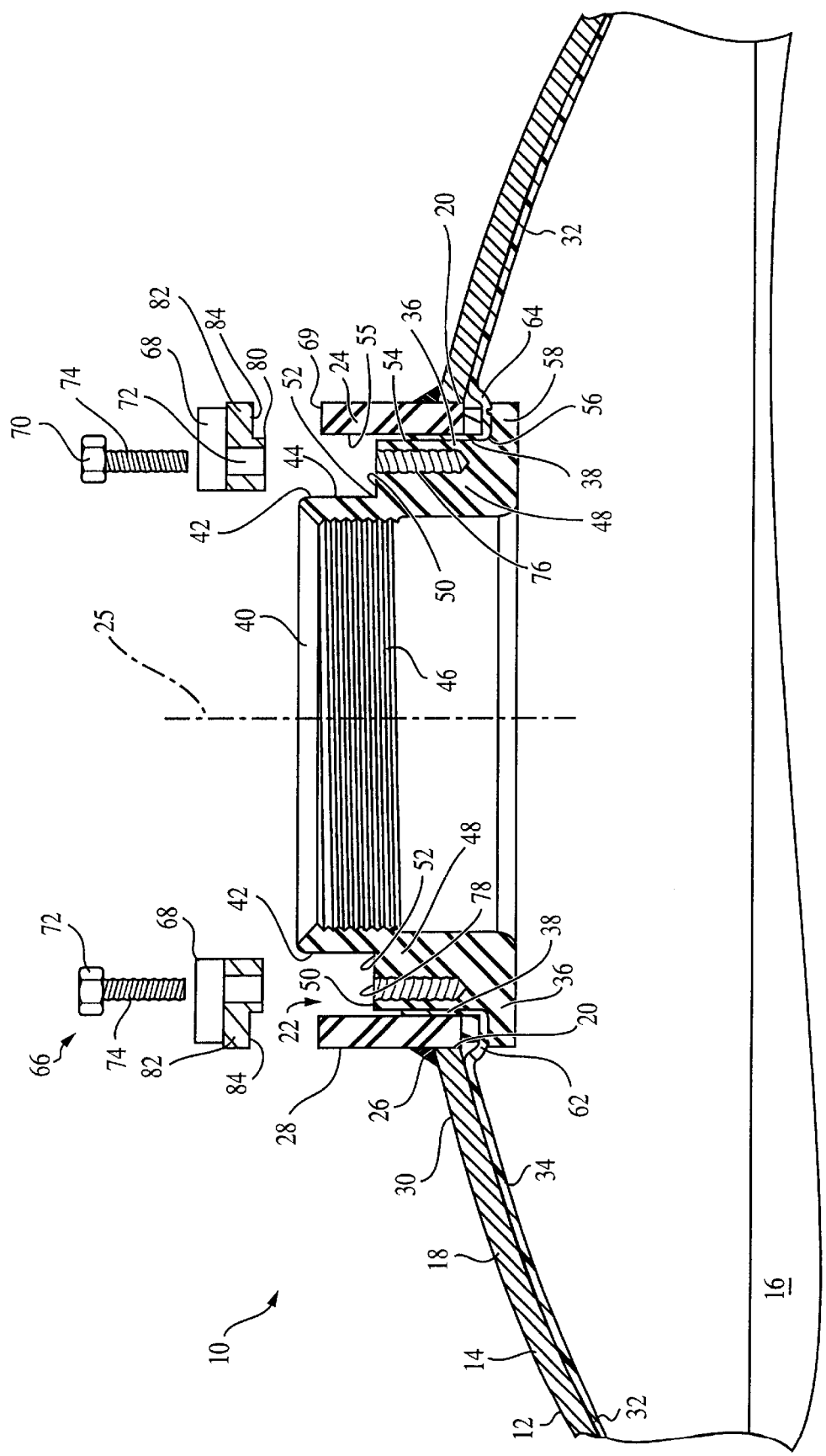
FIG. 1 is a vertical sectional view of a partially assembled and exploded top portion of a tank head in a water softener treatment tank of the present invention with hold down plates and bolts.

Referring now to FIG. 1, a water conditioning tank assembly for a water softener is generally designated 10. The tank assembly 10 includes a preferably steel water treatment tank 12 having a tank head 14 which is sealingly secured, as by welding to a cylindrical side wall 16.

The tank head 14 includes a wall 18, which is preferably dome-shaped with a preferred continuous radius of curvature. A rim 20 or edge of the wall 18 defines a through hole 22 generally centrally located on the tank head 14. A tank ring 24 is coaxial with the tank head 14 and extends generally axially or generally parallel to a centerline 25 of the tank assembly 10. In the preferred embodiment, a fillet weld 26 is disposed along an exterior wall 28 of the tank ring adjacent an exterior surface 30 of the tank head 14 to attach the tank ring 24 to the tank head. It will be appreciated that other known welds or devices could be used to connect the tank ring 24 to the rim 20. While metal tanks are preferred, fiberglass or other types of polymeric tanks are also contemplated.

A polymeric liner 32 is placed on an interior surface 34 of the wall 18 and the side wall 16 of the tank 12, and has an edge 36 (best seen in FIG. 2) that defines an opening 38 to the interior of the liner. The liner 32 is preferably made of a sheet of polyvinyl chloride or a similar plastic material.

Referring again to FIG. 1, the tank head 14 is configured to receive a generally cylindrical mounting collar or flange 40 which includes an internal vertically projecting nipple portion 42 with a peripheral wall 44 and defines an internal threaded aperture 46. The aperture 46 is configured for threaded engagement with a water softener control valve (not shown) and a brace or filter (not shown). These attachments, as are known in the art, secure a concentrically located, generally tubular manifold (also not shown) that defines a path for the flow of water to and from the tank 12. Water enters the tank within the aperture between the manifold and walls of the aperture 46.

A shoulder 48 also extends radially from the nipple portion 42 and has a top surface 50. The top surface 50 also extends radially from a lower edge 52 of the peripheral wall 44 of the nipple portion. An outer peripheral wall 54 of the shoulder 48 extends downwardly from the top surface 50.

The outer peripheral wall 54 matingly corresponds or registers with a side wall 55 of the tank ring 24 so that the flange 40 fits snugly within the opening 22. The rim 20, the tank ring 24 and the shoulder 48 are all preferably elliptical, while the nipple portion 42 is preferably circular. However, other non-circular configurations are contemplated. It will be appreciated that the non-circular or elliptical shapes are used for preventing further rotation of the flange 40 upon engagement with the valve (not shown), while enabling the placement of the flange 40 through the hole 22 so that the flange can be mounted in the inside of the tank head 14 even if the tank head 14 is already secured to the side wall 16.

Figure 2:
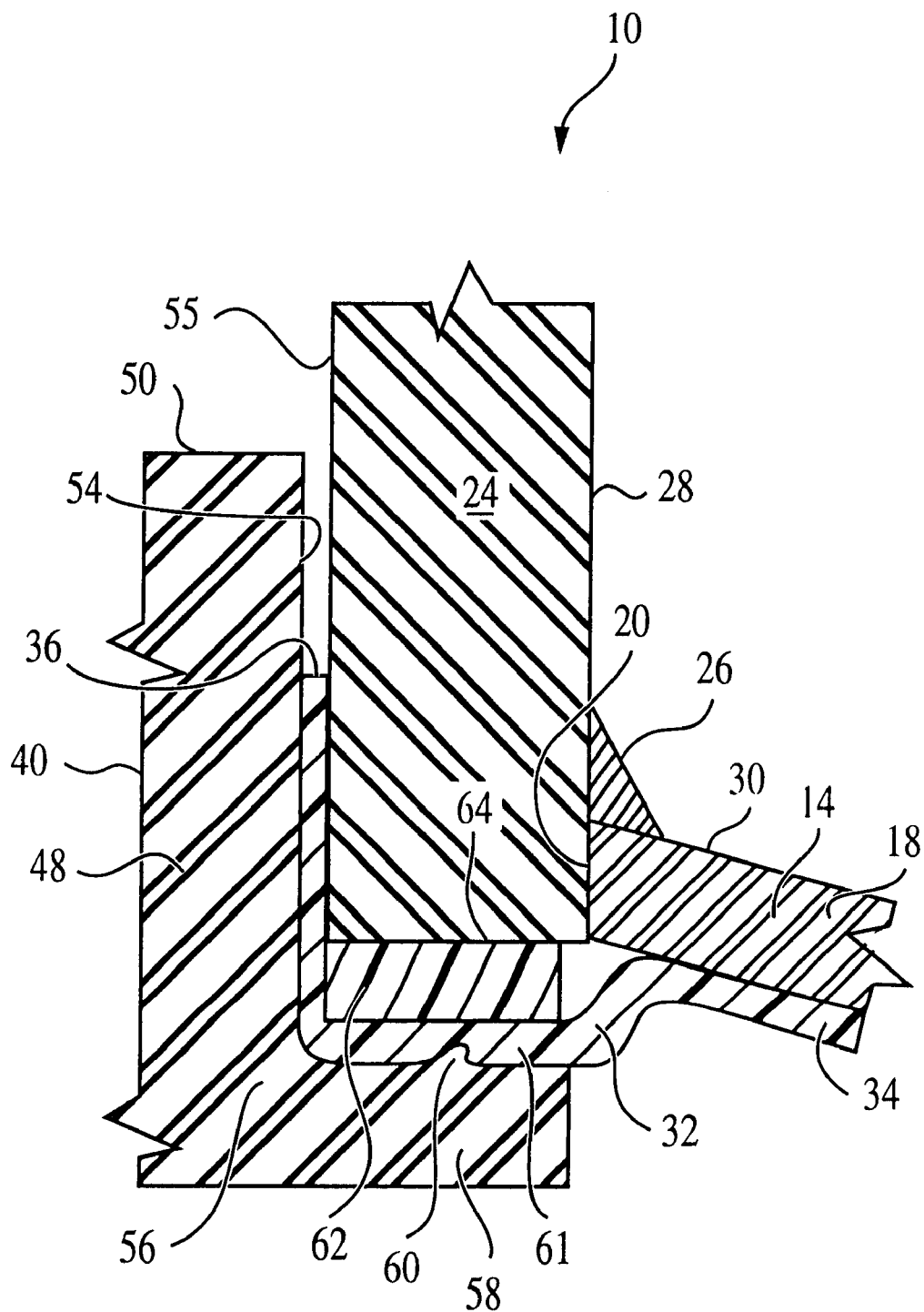
FIG. 2 is a close-up view of an assembled portion of the tank of FIG. 1.

Refering now to FIG. 2, the edge 36 of the liner 32 is configured and disposed between the outer peripheral wall 54 and the side wall 55 of the tank ring 24 so that the outer peripheral wall and tank ring cooperatively pinch the edge 36 for securing the edge 36 therebetween. This configuration further provides a water tight and air tight seal between the liner 32 and the flange 40.

A ledge 58 extends radially from a base 56 of the shoulder 54 and faces upward toward the bottom or bottom wall 64 of the tank ring 24. A vertically projecting annular lip 60 is preferably integrally formed on the ledge 58. A portion 61 of the liner 32 is further sealingly secured between the lip 60 and an annular, flat, flexible gasket 62 that engages the bottom 64 of the tank ring 24.

The annular flat gasket 62 extends generally opposite the ledge 58, between the bottom 64 of the tank ring and the liner 32. The gasket 62 and the liner 32 align with the outer peripheral wall 54. This configuration provides a water tight and air tight seal around the through hole 22. An air tight seal is needed because air is used to push the liner 32 tight against the walls 18, 16 of the tank 12. Notably, air leaks will cause the liner 32 to collapse inward in the tank 12. Upon assembly, the liner 32 is secured to the first ledge 58 and to the lip 60, preferably without using radio frequency (RF) welding, sealant or adhesive.

Referring again to FIG. 1, the tank assembly 10 further includes a fastener assembly 66 that enables elimination of the need to weld the liner 32 to the flange 40 while securing the flange 40 within the tank head opening 22. Specifically, the fastener assembly 66 secures the flange 40 on the tank head 14 through contact between the fastener assembly and the tank ring 24, and also sealingly clamps the liner 32 to the flange 40.

The fastener assembly 66 includes at least one hold down plate 68 configured and disposed above the tank ring 24 and the flange 40 so that it is engageable on the top surface 50 of the shoulder 48 and the top 69 of the tank ring 24. Preferably, at least one threaded fastener 70 attaches the hold down plate 68 to the shoulder 48. In this manner, when the fastener 70 is tightened toward the flange 40, the fastener pushes the hold down plate 68 against the top 69 of the tank ring 24 and toward the shoulder 48. This pulls the flange 40 against the bottom 64 of the tank ring 24. The tightening of the fasteners 70 squeezes the liner 32, gasket 62 and tank ring 24 between the hold down plate 66 and the ledge 58 of the flange 40.

In the preferred embodiment, a through hole 72 is also defined by the hold down plate 68 and is configured and disposed so that the threaded fastener 70 has a shank 74 dimensioned to pass through the through hole 72 and matingly engages a threaded bore 76 defined by the flange 40. The through hole 72 on the hold down plate 68 has a diameter smaller than the width of the head of the fastener 70 to create the clamping action. The threaded bore 76 is further defined by, or extends in, the shoulder 48 with an opening 78 defined on the top surface 50.

As a feature of the hold down plate 68, a collar portion 80 has a radially extending ledge 82 that defines an undercut 84 for engaging the top 69 of the tank ring 24. The hold down plate 68 and the shoulder 48 are configured and disposed in opposing relationship to each other so that at least a portion 86 of the hold down plate is disposed between the peripheral wall 44 of the nipple portion 42 and the side wall 55 of the tank ring 24.

It will be appreciated that while using one hold down plate will suffice, two diametrically positioned hold down plates 68 and two corresponding fasteners 70 are preferred. It is also preferred that the hold down plates 68 are configured to have a height relative to the distance between the upper end of the flange 40 and the top surface 50 so that once the hold down plates 68 are secured to the flange 40, the bolt heads will not project above an upper end of the nipple portion 42.

The present flange 40 is preferably made out of metal, and formed of steel or other alloy for example, when the diameter of the flange exceeds four inches. When flanges have smaller diameters, the use of high strength, environmentally resistant plastic for smaller plastic tanks is contemplated as being more cost effective.

In operation, the water flows into the flange 40 from a conduit on a control valve (not shown) attached to the top of the nipple portion 42 at the aperture 46. The water flows between the aperture 46 and the manifold (not shown). Treated water that flows to the bottom of the tank 12 then enters the lower end of the manifold. The treated water flows through the manifold, and then, flowing back out the aperture 46, the treated water flows through the conduit, preferably, for use in water fixtures.

It will be appreciated that the improved treatment tank of the present invention has a number of features for easier maintenance, and which result in greater operational efficiency. Problems with positioning welding tools within the tank 12 to attach the liner 32 to the ledge 58 are eliminated by securing the liner 32 between the flange 40 and the tank ring 24 in two separate places. The liner 32 is clamped between the ledge 58 of the flange 40 and the bottom 64 of the tank ring 24 and also pinched between the outer periphery 54 of the shoulder 48 and the side wall 55 of the tank ring 24. Both locations provide a water and air tight seal between the flange 40 and the liner 32, so that even if one location fails, such as if gasket 62 wears out due to compression set, a seal can still be maintained between the liner 32 and flange 40 at the other location. Furthermore, this configuration also maintains the opening 36 of the liner 32 in a position that is not directly exposed to water flowing into the tank 12 through the aperture 46, so that incoming water cannot peel the edge 36 of the liner 32 from the flange 40. Finally, flange 40 and liner 32 are configured to provide for easy attachment of the liner 32 to the flange. The fastener assembly 66 eliminates the need for threading the periphery 44 of the nipple portion 42 for engagement with a nut.

While particular embodiments of the improved center opening treatment tank of the present invention has been shown and described, it will be appreciated by those skilled in the art that changes and modifications may be made thereto without departing from the invention in its broader aspects and as set forth in the following claims.

What is claimed is:

1. A treatment tank for a water conditioning apparatus, comprising:
   a tank head having a wall, a rim defining a through hole in said wall, and a tank ring having a bottom, a top and being fixed to said rim, said tank ring being coaxial with said tank head and extending generally axially;
   a generally cylindrical flange defining a nipple portion having a peripheral wall and a shoulder extending radially from said nipple portion, and having a top surface and an outer peripheral wall extending downward from said top surface; and
   a fastener assembly engageable on said top surface of said shoulder for securing said flange on said tank head through contact between said fastener assembly and said tank ring;
   wherein said fastener assembly includes at least one hold down plate configured and disposed above said tank ring so that said flange is secured against said bottom of said tank ring by tightening said hold down plate against said top of said tank ring;
   wherein said generally cylindrical flange includes a ledge extending radially from a base of said shoulder, and configured to sandwich said tank ring between said at least one hold down plate and said ledge.

2. The tank according to claim 1, wherein said wall of said tank head further has an interior surface, and wherein said tank further comprises a liner disposed against said interior surface of said wall and having an edge defining an opening, said outer peripheral wall being further configured and disposed to matingly register with said tank ring, said edge of said liner being configured and disposed so that said outer peripheral wall and said tank ring cooperatively pinch said edge for securing said edge therebetween.

3. The tank according to claim 1 further comprising:
   a liner disposed against an interior surface of said wall of said tank head; and an annular flat gasket configured and disposed between said tank ring and said liner so that tightening of said fastener assembly clamps said-gasket-and-said liner between said bottom of said tank ring and said flange.

4. The tank according to claim 3, wherein said flange is configured to face said tank ring, said liner having a portion extending along said ledge, said gasket and said portion being disposed in proximity to said ledge so that tightening of said fastener assembly clamps said gasket and said liner between said bottom of said tank ring and said ledge.

5. The tank according to claim 1, wherein said hold down plate further defines a through hole configured and disposed so that a threaded fastener having a shank dimensioned to pass through said through hole matingly engages a threaded bore defined by said flange.

6. The tank according to claim 5, wherein said threaded bore is further defined by said shoulder with an opening defined on said top surface.

7. The tank according to claim 1, wherein said hold down plate further includes a collar portion and a ledge that extends radially from said collar portion and defines an undercut for engaging said top of said tank ring.

8. The tank according to claim 1, wherein said hold down plate and said shoulder are configured and disposed in opposing relationship to each other so that at least a portion of said hold down plate is disposed between said peripheral wall of said nipple portion and said tank ring.

9. The tank according to claim 1, wherein said tank ring is welded to said rim of said tank head.

10. The tank according to claim 1, wherein said peripheral wall of said nipple portion further includes a lower edge, and wherein said top surface further extends radially from said lower edge of said peripheral wall.

11. The tank according to claim 1, wherein said flange is made of metal.

12. A treatment tank for a water conditioning apparatus, comprising:

a tank head having a wall with an interior surface, a rim defining a through hole in said wall, and a tank ring having a top and a bottom and being coaxial with said tank head and extending generally axially;

a generally cylindrical flange defining a nipple portion having a peripheral wall, and a shoulder extending radially from said nipple portion and having a top surface and an outer peripheral wall extending generally parallel to said tank ring so that said outer peripheral wall matingly registers with said tank ring;

a liner disposed against said interior surface of said wall of said tank head and having an edge defining an opening, said edge being configured and disposed on said flange for forming a water tight seal between said flange and said liner without adhering or welding said liner to said flange; and a fastener assembly engageable on said top surface of said shoulder for securing said flange on said tank head through contact between said fastener assembly and said tank ring;

said fastener assembly further includes at least one hold down plate configured and disposed above said tank ring so that said flange is secured against said bottom of said tank ring by tightening said hold down plate against said top of said tank ring;

said hold down plate further defines a through hole configured and disposed so that a threaded fastener having a shank dimensioned to pass through said through hole matingly engages a threaded bore defined by said flange; and said generally cylindrical flange includes a ledge extending radially from a base of said shoulder, and configured to sandwich said tank ring between said at least one hold down plate and said ledge.

13. The tank of claim 12, wherein said tank ring further has a side wall facing said flange and wherein said edge of said liner is further disposed so that said outer peripheral wall and said side wall of said tank ring cooperatively pinch said edge for securing said edge therebetween.

14. The tank according to claim 12, wherein said fastener assembly is engageable on said top surface of said shoulder for securing said flange on said tank head and for securing said liner to said flange through contact between said fastener assembly and said bottom of said tank ring.

15. The tank according to claim 14, further comprising an annular flat gasket, and wherein said shoulder further includes a base and said ledge radially extending from said base, and wherein said gasket and a portion of said liner is disposed in proximity to said ledge so that tightening of said fastener assembly clamps said liner and said gasket between said ledge and said bottom of said tank ring for further forming a water tight seal.

16. The tank according to claim 12, wherein said threaded bore is further defined by said shoulder with an opening defined on said top surface.

17. The tank according to claim 12, wherein said hold down plate further includes a collar portion and a ledge that extends radially from said collar portion and defines an undercut for engaging said top of said tank ring.

18. The tank according to claim 12, wherein said hold down plate and said shoulder are configured and disposed in opposing relationship to each other so that at least a portion of said hold down plate is disposed between said peripheral wall of said nipple portion and said tank ring.

19. A treatment tank for a water conditioning apparatus, comprising:

a tank head having a wall with an interior surface, a rim defining a through hole in said wall, and a tank ring being coaxial with said tank head and extending generally axially, said tank ring having a top and a bottom;

a generally cylindrical flange defining a nipple portion having a peripheral wall, and a shoulder extending radially from said nipple portion and having a top surface, an outer peripheral wall extending generally parallel to said tank ring and a ledge radially extending from said outer peripheral wall, said ledge being configured and disposed to engage said bottom of said tank ring;

a liner disposed against said interior surface of said wall of said tank head and having a portion disposed along said ledge;

a fastener assembly engageable on said top surface of said shoulder for securing said flange on said tank head through contact between said fastener assembly and said top of said tank ring;

an annular flat gasket configured and disposed between said tank ring and said liner so that tightening of said fastener assembly clamps said gasket and said liner between said bottom of said tank ring and said ledge for forming a water tight seal;

said fastener assembly further includes at least one hold down plate configured and disposed above said tank ring so that said flange is secured against said bottom of said tank ring by tightening said hold down plate against said top of said tank ring; and said ledge is configured to sandwich said tank ring between said at least one hold down plate and said ledge.

* * * * *